(12) United States Patent
Müller et al.

(10) Patent No.: US 12,138,983 B2
(45) Date of Patent: Nov. 12, 2024

(54) MULTI-POINT LINK FOR AN UNDERCARRIAGE OF A VEHICLE

(71) Applicant: ZF FRIEDRICHSHAFEN AG, Friedrichshafen (DE)

(72) Inventors: Ingolf Müller, Minfeld (DE); Jens Heimann, Stetten (DE); Andre Stieglitz, Osnabrück (DE); Carsten Sohl, Fredericia (DK); Valentin Hörtdörfer, Hirschberg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 140 days.

(21) Appl. No.: 17/609,051

(22) PCT Filed: Apr. 8, 2020

(86) PCT No.: PCT/EP2020/060017
§ 371 (c)(1),
(2) Date: Nov. 5, 2021

(87) PCT Pub. No.: WO2020/224906
PCT Pub. Date: Nov. 12, 2020

(65) Prior Publication Data
US 2022/0212511 A1 Jul. 7, 2022

(30) Foreign Application Priority Data
May 6, 2019 (DE) ...................... 10 2019 206 435.3

(51) Int. Cl.
*B60G 7/00* (2006.01)
*F16C 7/02* (2006.01)

(52) U.S. Cl.
CPC .............. *B60G 7/001* (2013.01); *F16C 7/026* (2013.01); *B60G 2206/014* (2013.01);
(Continued)

(58) Field of Classification Search
CPC .............. B60G 7/001; B60G 2206/014; B60G 2206/121; B60G 2206/7101;
(Continued)

(56) References Cited

U.S. PATENT DOCUMENTS

| 369,883 | A | * | 9/1887 | Richards | ................. F16C 7/023 74/594 |
| 2,274,417 | A | * | 2/1942 | Katcher | .............. F16C 11/0604 403/226 |

(Continued)

FOREIGN PATENT DOCUMENTS

| DE | 10 2009 049400 | 4/2011 |
| DE | 10 2012 213663 | 2/2014 |

(Continued)

OTHER PUBLICATIONS

International Search Report issued in corresponding PCT Application PCT/EP2020/060017 filed Apr. 8, 2020.

(Continued)

*Primary Examiner* — Timothy Wilhelm
(74) *Attorney, Agent, or Firm* — Cozen O'Connor (57) ABSTRACT

The invention is directed to a multipoint link (1) for an undercarriage of a vehicle, comprising a core element (5) formed from a foamed material and at least one roving (10) of bundled continuous filaments wound around the core element (5), wherein the at least one roving (10) winding around the core element (5) in at least one layer forms an outer layer of the multipoint link (5), wherein the core element (5) is constructed as a hollow body which comprises at least two shell elements (11, 12).

17 Claims, 9 Drawing Sheets

(52) U.S. Cl.
CPC .... *B60G 2206/12* (2013.01); *B60G 2206/121* (2013.01); *B60G 2206/7101* (2013.01); *B60G 2206/821* (2013.01); *B60G 2206/85* (2013.01)

(58) Field of Classification Search
CPC .......... B60G 2206/821; B60G 2206/85; B60G 2206/12; F16C 7/026
See application file for complete search history.

(56) References Cited

U.S. PATENT DOCUMENTS

| | | | | |
|---|---|---|---|---|
| 2,723,705 | A * | 11/1955 | Collins | B29C 53/68 138/140 |
| 3,015,238 | A * | 1/1962 | Williams | B60G 17/005 301/137 |
| 3,111,569 | A * | 11/1963 | Rubenstein | B29C 70/86 264/45.2 |
| 3,370,483 | A * | 2/1968 | Ditlinger | B64C 27/327 416/135 |
| 3,408,124 | A * | 10/1968 | Melton | F16C 11/083 403/288 |
| 3,411,379 | A * | 11/1968 | Deyerling | B29C 53/564 74/579 R |
| 3,475,988 | A * | 11/1969 | Ditlinger | F16C 7/026 416/135 |
| 3,722,931 | A * | 3/1973 | Uchida | F16C 11/0619 280/93.508 |
| 4,183,261 | A * | 1/1980 | Eiselbrecher | B29C 70/56 24/265 EE |
| 4,300,410 | A * | 11/1981 | Raghupathi | B29C 53/564 428/377 |
| 4,353,267 | A * | 10/1982 | Robert | B29C 70/86 74/579 R |
| 4,411,114 | A * | 10/1983 | Wurtinger | F16C 7/026 403/267 |
| 4,414,860 | A * | 11/1983 | Brunsch | F16C 7/026 74/579 E |
| 4,552,035 | A * | 11/1985 | Skipper | B64C 27/327 59/84 |
| 4,603,084 | A * | 7/1986 | Drachenberg | F16C 7/026 428/377 |
| 4,650,620 | A * | 3/1987 | Owen | B29C 53/821 264/257 |
| 4,671,336 | A * | 6/1987 | Anahara | F16C 7/026 74/579 E |
| 4,704,918 | A * | 11/1987 | Orkin | F16C 7/026 464/181 |
| 4,750,960 | A * | 6/1988 | Bubeck | B65H 71/007 156/169 |
| 4,772,044 | A * | 9/1988 | Booher | B29C 70/52 267/47 |
| 4,811,626 | A * | 3/1989 | Bezin | B62M 3/00 74/594.1 |
| 4,841,801 | A * | 6/1989 | Tice | F16C 7/026 123/197.3 |
| 4,857,124 | A * | 8/1989 | Shobert | B29C 53/68 156/149 |
| 4,873,889 | A * | 10/1989 | Ditlinger | B29C 53/56 464/69 |
| 4,883,289 | A * | 11/1989 | Sardou | F16F 1/366 267/273 |
| 4,887,486 | A * | 12/1989 | Wood, Jr. | F16C 11/0619 403/141 |
| 4,992,313 | A * | 2/1991 | Shobert | B29C 63/24 428/36.1 |
| 5,267,751 | A * | 12/1993 | Hiromoto | F16F 1/368 280/124.134 |
| 5,374,780 | A * | 12/1994 | Pazdirek | B29C 70/86 174/209 |
| 5,397,272 | A * | 3/1995 | Smiley | F16C 3/026 464/181 |
| 5,406,033 | A * | 4/1995 | Pazdirek | H01B 17/325 174/209 |
| 5,435,869 | A * | 7/1995 | Christensen | B29C 70/347 156/169 |
| 5,556,081 | A * | 9/1996 | Miura | B29C 70/86 267/47 |
| 5,690,034 | A * | 11/1997 | Schahl | B29C 70/86 105/199.1 |
| 5,720,833 | A * | 2/1998 | Grube | B60G 7/001 264/68 |
| 5,788,263 | A * | 8/1998 | VanDenberg | B60G 21/051 280/124.157 |
| 5,992,867 | A * | 11/1999 | Kato | B60G 7/001 280/124.134 |
| 6,116,113 | A * | 9/2000 | Pazdirek | B29C 70/207 57/230 |
| 6,129,367 | A * | 10/2000 | Bublies | B60G 21/051 280/124.107 |
| 6,152,433 | A * | 11/2000 | Hettich | B60G 7/001 180/352 |
| 6,193,089 | B1 * | 2/2001 | Yu | B65D 45/02 220/327 |
| 6,202,505 | B1 * | 3/2001 | Auberon | F16C 7/026 74/579 R |
| 6,324,940 | B1 * | 12/2001 | Pazdirek | F16C 7/026 57/230 |
| 6,371,682 | B1 * | 4/2002 | Maughan | B62D 7/16 280/93.508 |
| 6,564,675 | B1 * | 5/2003 | Jiang | B62K 19/16 74/594.1 |
| 6,749,360 | B2 * | 6/2004 | Abels | B60G 7/001 403/294 |
| 6,905,129 | B2 * | 6/2005 | Runte | B60G 7/001 280/124.134 |
| 6,958,105 | B2 * | 10/2005 | Herrmann | B29C 70/443 156/245 |
| 7,013,753 | B2 * | 3/2006 | Valle | B62K 19/16 74/594.1 |
| 7,028,998 | B2 * | 4/2006 | Daily | B60G 21/055 267/273 |
| 7,086,655 | B2 * | 8/2006 | Chan | B60G 7/001 280/124.132 |
| 7,205,251 | B2 * | 4/2007 | Wellman | B29C 70/347 442/373 |
| 7,451,795 | B2 * | 11/2008 | Weg | B29C 53/8091 156/425 |
| 7,753,384 | B2 * | 7/2010 | Kunze | B60G 9/00 280/124.143 |
| 7,918,439 | B2 * | 4/2011 | Morales Arnaez | B60G 7/001 267/141.3 |
| 7,921,629 | B2 * | 4/2011 | Scholten | D04H 3/045 57/13 |
| 7,959,236 | B2 * | 6/2011 | Mercat | B60B 21/04 152/381.6 |
| 7,980,575 | B2 * | 7/2011 | Quaing | B60G 9/00 180/358 |
| 8,024,993 | B2 * | 9/2011 | Dal | B29C 70/16 74/594.1 |
| 8,394,222 | B2 * | 3/2013 | Rettig | B29C 53/8016 156/169 |
| 8,444,159 | B2 * | 5/2013 | Zuber | B60G 21/0551 280/124.106 |
| 8,617,336 | B2 * | 12/2013 | Kawamura | B29C 53/564 156/173 |
| 8,714,571 | B2 * | 5/2014 | Nataraj | B60G 7/005 280/124.13 |
| 8,777,162 | B2 * | 7/2014 | Benthien | F16C 7/026 244/131 |
| 8,777,244 | B2 * | 7/2014 | Seethaler | B60G 3/06 280/124.17 |
| 8,793,965 | B2 * | 8/2014 | Kurath-Grollmann | B29D 24/002 52/843 |
| 8,814,187 | B2 * | 8/2014 | Pedersen | B60G 7/001 280/124.134 |
| 8,863,616 | B2 * | 10/2014 | Ciavatta | B62M 3/00 74/594.1 |
| 9,090,289 | B2 * | 7/2015 | Heise | B62D 29/001 |

(56) References Cited

U.S. PATENT DOCUMENTS

| | | | |
|---|---|---|---|
| 9,121,458 B2* | 9/2015 | Dilje | F16D 23/025 |
| 9,168,801 B2* | 10/2015 | Dicke | B60G 7/001 |
| 9,259,878 B2* | 2/2016 | Valembois | F16C 7/026 |
| 9,393,850 B2* | 7/2016 | Kuroda | B60G 21/0551 |
| 9,404,249 B2* | 8/2016 | Langone | E04B 1/30 |
| 9,555,683 B2* | 1/2017 | Eismann | B60G 9/022 |
| 9,610,818 B2* | 4/2017 | Mark | F16F 1/3849 |
| 9,616,725 B2* | 4/2017 | Kuroda | B60G 7/005 |
| 9,751,564 B2* | 9/2017 | Muehlhausen | B62D 29/005 |
| 9,937,657 B2* | 4/2018 | Wakeman | B32B 5/28 |
| 10,105,916 B2* | 10/2018 | Dal Prà | B62M 3/00 |
| 10,162,107 B2* | 12/2018 | Paré | G01J 3/10 |
| 10,189,326 B2* | 1/2019 | Steber | B29C 66/1284 |
| 10,220,666 B2* | 3/2019 | Kuroda | B60G 21/055 |
| 10,239,373 B2* | 3/2019 | Hugo | B60G 7/001 |
| 10,350,951 B2* | 7/2019 | Meyer | B29C 70/443 |
| 10,471,790 B2* | 11/2019 | Meyer | B60G 7/001 |
| 10,487,869 B2* | 11/2019 | Beale | F16C 7/026 |
| 10,493,703 B2* | 12/2019 | Yasui | B64C 9/02 |
| 10,549,592 B2* | 2/2020 | Meyer | B29C 45/14336 |
| 10,562,349 B2* | 2/2020 | Nagel | B60G 11/465 |
| 10,850,329 B2* | 12/2020 | Tenhaeff | B60G 7/001 |
| 10,864,788 B2* | 12/2020 | Müller | B60G 7/001 |
| 10,870,241 B2* | 12/2020 | Eichenhofer | B29C 70/521 |
| 10,919,359 B2* | 2/2021 | Rapp | B60G 7/001 |
| 10,974,559 B2* | 4/2021 | Mainz | B29C 70/081 |
| 11,014,610 B2* | 5/2021 | Bierbaumer | B62D 65/02 |
| 11,104,195 B2* | 8/2021 | Stieglitz | B60G 7/001 |
| 11,173,763 B2* | 11/2021 | Stieglitz | F16C 7/026 |
| 11,241,928 B2* | 2/2022 | Kim | B60G 7/001 |
| 11,298,997 B2* | 4/2022 | Stieglitz | B60G 7/001 |
| 11,485,185 B2* | 11/2022 | Stieglitz | B60G 7/001 |
| 11,519,460 B2* | 12/2022 | Falossi | F16C 33/64 |
| 11,541,710 B2* | 1/2023 | Hoschouer | B60G 7/005 |
| 2003/0160414 A1 | 8/2003 | Pincerato | B60G 7/001 280/93.51 |
| 2004/0045762 A1* | 3/2004 | Budde | B62D 29/004 180/312 |
| 2004/0051268 A1* | 3/2004 | Chan | B60G 9/003 280/124.1 |
| 2004/0135337 A1* | 7/2004 | Alesso | B60G 7/001 280/124.134 |
| 2005/0044984 A1* | 3/2005 | Jones | E04C 3/29 74/579 R |
| 2005/0056503 A1* | 3/2005 | Jones | B29C 53/564 188/321.11 |
| 2005/0276945 A1* | 12/2005 | Muggli | B29C 37/0082 428/119 |
| 2005/0281610 A1* | 12/2005 | MacLean | F16C 11/0633 403/56 |
| 2007/0186719 A1* | 8/2007 | Ciavatta | B29C 70/86 74/594.1 |
| 2007/0199403 A1* | 8/2007 | Ciavatta | F16C 3/22 74/594.1 |
| 2007/0264470 A1* | 11/2007 | Wellman | B29C 37/0085 428/105 |
| 2008/0272572 A1* | 11/2008 | Tsai | B62M 3/00 280/281.1 |
| 2009/0014977 A1* | 1/2009 | Molenaar | B60G 7/001 280/124.134 |
| 2010/0084834 A1* | 4/2010 | Ersoy | B60G 7/001 280/124.1 |
| 2010/0196637 A1* | 8/2010 | Lippert | F16C 7/026 428/36.1 |
| 2010/0209185 A1* | 8/2010 | Kirth | B29C 70/86 403/292 |
| 2012/0211931 A1* | 8/2012 | Fane De Salis | F16F 1/368 267/158 |
| 2012/0305173 A1* | 12/2012 | Masson | B29C 70/545 156/185 |
| 2012/0315414 A1* | 12/2012 | Wesch | B62D 29/005 428/34.1 |
| 2015/0030806 A1* | 1/2015 | Fink | B32B 15/046 428/116 |
| 2015/0158361 A1* | 6/2015 | Eismann | B60G 9/022 280/124.116 |
| 2016/0355914 A1* | 12/2016 | Takemura | C22F 1/047 |
| 2017/0130764 A1* | 5/2017 | Yasui | F16C 7/026 |
| 2017/0355239 A1* | 12/2017 | Souschek | B60G 3/02 |
| 2018/0126689 A1* | 5/2018 | Gaigler | B29C 53/607 |
| 2019/0133807 A1* | 5/2019 | Siewert | A61F 5/0127 |
| 2019/0160903 A1* | 5/2019 | Schramm | B29C 70/345 |
| 2020/0180376 A1* | 6/2020 | Stieglitz | B60G 7/001 |
| 2020/0223273 A1* | 7/2020 | Kwon | B29C 45/14754 |
| 2020/0307333 A1* | 10/2020 | Reddehase | F16C 11/0609 |
| 2021/0107243 A1* | 4/2021 | Eichenhofer | B29C 70/86 |
| 2021/0323135 A1* | 10/2021 | Lübkert | B29C 45/0005 |
| 2022/0212511 A1* | 7/2022 | Müller | B60G 7/001 |

FOREIGN PATENT DOCUMENTS

| | | | | |
|---|---|---|---|---|
| DE | 102012213663 A1 * | 2/2014 | | B62D 21/11 |
| DE | 10 2013 007375 | 3/2014 | | |
| DE | 10 2013 225911 | 6/2015 | | |
| DE | 102013225911 A1 * | 6/2015 | | B60G 7/02 |
| DE | 102015218026 | 3/2017 | | |
| DE | 10 2016 209 041 | 11/2017 | | |
| DE | 102016209041 A1 * | 11/2017 | | B60G 7/001 |
| DE | 10 2016 122155 | 5/2018 | | |

OTHER PUBLICATIONS

Search Report dated Jan. 25, 2022 issued in German Patent Application No. 10 2019 206 435.3.

* cited by examiner

MULTI-POINT LINK FOR AN UNDERCARRIAGE OF A VEHICLE

CROSS REFERENCE TO RELATED APPLICATIONS

This is a U.S. national stage of International application No. PCT/EP2020/060017, filed on Apr. 8, 2020, which claims priority to German Application No. 10 2019 206 435.3, filed May 6, 2019, the content of each of which is incorporated herein by reference.

BACKGROUND OF THE INVENTION

1. Field of the Invention

The invention is directed to a multipoint link for an undercarriage of a vehicle. The present invention is further directed to a method for producing a multipoint link for an undercarriage of a vehicle.

2. Description of the Prior Art

Multipoint links, for example, a four-point link, are used particularly in utility vehicles to guide a rigid axle resiliently in a vehicle frame. A multipoint link constructed as a four-point link takes on the functions of transverse guidance and longitudinal guidance of the rigid axle. Beyond this, a multipoint link of this kind performs the function of a stabilizer and is therefore is exposed to additional roll loads, during roll motions of a vehicle body which occur, e.g., during cornering.

A multipoint link constructed as a three-point link is used in tractor units in the utility vehicle sector to link the axle to the structural frame. Three-point links contribute in large measure to the transverse guidance and longitudinal guidance of the axle. A three-point link guides the axle in an upper link plane and is exposed to high longitudinal loads and transverse loads during driving operation of the utility vehicle.

A multipoint link of the type mentioned above is known from DE 10 2016 209 041 A1. The multipoint link comprises a core element made from a foamed material and at least one roving (filament bundle) which is wound around the core element. The at least one roving winding around the core element in at least one layer forms an outer layer of the multipoint link. The core element is provided mainly to form the inner shape of the multipoint link. The core element itself is not provided for absorbing loads or, if so, only conditionally. Rather, it is provided primarily for laying or wrapping with the roving in order to form a loadable supporting structure. Loads and forces which are introduced into the multipoint link in load introduction areas provided for this purpose through a vehicle axle or a wheel carrier are chiefly absorbed by the outer layer of the multipoint link formed from at least one roving. The core element around which the at least one roving is wound during a winding process provides the respective component contour of the multipoint link. The core element must absorb the forces exerted on it during the winding process, particularly at the start of the winding process, by the at least one roving which is kept under tension. The core element may deform only very slightly during winding because the core element imparts shape to the multipoint link, and substantial geometric dimensions (kinematic points) of the multipoint link must be set within close tolerances. To this end, the core element known from DE 10 2016 209 041 A1 is constructed as a permanent and simultaneously solid core. Constructing as a solid core is disadvantageous in that it has a relatively high mass because of the high-density foamed material which is utilized. The construction of the core element as a temporary core element in the form of a disposable core has the disadvantage of a high expenditure for producing a disposable core of this kind and for its removal from the finished multipoint link.

A multipoint link is also known from U.S. Pat. No. 4,650,629.

SUMMARY OF THE INVENTION

Proceeding from the prior art described above, it is an object of the present invention to further develop a multipoint link for an undercarriage of a vehicle, particularly passenger car or utility vehicle, which in particular enhances its suitability for high-volume production and accelerates the production process while lowering costs.

This object may be met with respect to an apparatus in which a multipoint link for an undercarriage of a vehicle comprises a core element formed from a foamed material and at least one roving of bundled continuous filaments wound around the core element. The at least one roving winding around the core element in at least one layer forms an outer layer of the multipoint link. The core element is constructed as a hollow body that comprises at least two shell elements. The construction of the core element as a hollow body that includes at least two parts has the advantage of a smaller mass compared to a solid core. The at least two shell elements can be produced more simply and inexpensively than core elements constructed as solid cores or disposable cores with reduced material input. Compared with disposable cores, the core element constructed as multiple-part hollow body has the additional advantage that loads can be absorbed during the use phase of the multipoint link in that the layer formed by winding remains in the interior. In addition, the foamed material can preferably have a higher density than foamed material which may be used to produce solid cores.

In particular, the roving can be impregnated immediately before winding around the core element, or a roving which is preimpregnated with resin (towpreg semifinished product) can be used. In the wet winding process, the roving is impregnated with resin immediately before winding and is wound around the core element. A maximum layup speed of the roving on the core element is limited to approximately 0.5 m/s due to the resin losses caused, for example, by centrifugal forces during the winding. By comparison, the layup speed can be substantially increased through the use of preimpregnated rovings because the resin is cured and centrifugal forces therefore have no influence. Robot-based 3D filament winding processes in particular allow a selective filament-optimized placement of preimpregnated rovings at a very high layup speed on a core element with virtually any desired contour. A towpreg semifinished product is preferably used to achieve the highest winding speeds. Owing to the tackiness of the preimpregnated semifinished product and the multi-axial rotation of component and rovings by one or more robots or rotary frames, curved winding paths can also be generated outside of a geodesic path, that is, outside of a shortest path connecting two points.

By roving is meant a bundle, strand or multifilament yarn comprising filaments (continuous fibers) arranged in parallel which is used predominantly for manufacturing fiber-reinforced plastics. Most often, filaments of glass, aramid or carbon are combined to form rovings.

The at least two shell elements are connected to one another by positive engagement and material bonding. The at least two shell elements can preferably be connected to one another by positive engagement and/or frictional engagement and/or material bonding. In the simplest case, the at least two shell elements can be connected to one another by material bonding by gluing. Gluing has the advantage that the hollow body forming the core element can be constructed fluid-tight. A positive engagement connection of the at least two shell elements offers the advantage that the positioning of the at least two shell elements when joined to form the core element can be predetermined.

In particular, the core element can have portions arranged at distal ends for receiving load introduction elements. To this end, bushings serving to introduce loads can be arranged in the portions of the core element, these bushings serving to receive load introduction elements. The load introduction elements can be constructed as ball-and-socket joints or elastomer bearings or molecular bearings, the bearing components being at least partially received by the bushings.

According to a preferred further development, the at least two shell elements can be formed symmetrical. In particular, when the core element to be produced has two perpendicular symmetry axes, the at least two shell elements can be produced by only one die.

The at least two shell elements can preferably have an internal supporting structure. The core element can be stiffened by the internal supporting structure. By providing the internal supporting structure, the core element can be constructed with thinner walls so that a further reduction in mass can be achieved. The internal supporting structure can be formed, for example, by point-shaped or line-shaped spacer elements or ribs. The spacer elements or ribs preferably extend substantially perpendicular to the inner surface of the respective shell element. Accordingly, the spacer elements or ribs can be arranged opposite one another in the joined position of the shell elements forming the core element.

It is advantageous when the at least two shell elements are connected by positive engagement and/or frictional engagement by the supporting structure. To this end, the supporting structure can be constructed as complementary connection elements which engage in one another at least in positive engagement when the at least two shell elements are joined together. Additionally, the complementary connection elements can be constructed with undercuts. The undercuts can be formed in a mushroom-shaped manner or as a stop. In this way, a kind of snap-in connection can be realized between the at least two shell elements. The production of the shell elements with undercuts is made possible when the foamed material used for production permits a nondestructive forced demolding from the die.

According to a preferred further development, the internal supporting structure can be formed as a material accumulation extending in portions over a two-dimensional plane of the respective shell element. The position and arrangement of the material accumulation can be provided, for example, at least partially by winding paths of the at least one roving. An at least partial orientation of the run of the material accumulation to load paths along which loads can be absorbed and transferred by the multipoint link is likewise advantageous. It will be appreciated that a material accumulation can be provided in combination with a supporting structure comprising point-shaped or line-shaped spacer elements or ribs.

In particular, the material accumulation can form a framework-like structure. A high load carrying capacity and stiffness of the shell elements can be achieved in this way.

Further, in order to join the at least two mated shell elements to form the core element, at least one separate roving can be provided to wind in portions around the at least two mated shell elements. By winding at least one separate roving around the at least two mated shell elements, joining is achieved by binding. Accordingly, a connection of the at least two shell elements through material bond, frictional engagement or positive engagement can be entirely or at least partially dispensed with.

In order to strengthen the core element, separate rovings can preferably be arranged in the interior and/or exterior of the core element in guide channels. A further strengthening of the core element can be achieved by arranging separate rovings in guide channels on the inner side of the shell elements and/or on the outer side of the shell elements, i.e., in the interior or on the exterior of the core element. The separate rovings can be arranged in an automated manner by robots. The laying of the separate rovings in the incorporated guide channels can be carried out such that a framework-like structure is formed. This makes the core element dimensionally stable, and the core element can absorb higher loads during the subsequent winding process. It is particularly advantageous when the framework-like structure on the outer side of the core element can be connected to the at least one roving forming an outer layer of the multipoint link by the winding process. A strengthening of the supporting structure of the core element can be achieved in this way. The separate rovings in the core element and on the outer side thereof function as framework-like inlay and stiffening of the supporting structure. Since the separate rovings need not be laid on free geodesic paths but rather are located in the guide channels, a very free and selective strengthening of the structure is possible, for example, for particularly load cases.

The shell elements which are brought together to form the core element are formed with walls which are substantially perpendicular to one another and which delimit the outer contour. The walls have undercuts which engage in one another by positive engagement in the joined state of the shell elements. Further, the walls have complementary undercuts at joining surfaces facing one another such that the at least two shell elements engage in one another in portions when put together. In addition, an adhesive can be applied in this area in order to connect the at least two shell elements by positive engagement as well as by material bonding. In particular, the undercuts are formed as projections, for example, in the form of steps.

The at least two shell elements can preferably be constructed fluid-tight in joined position so that a hollow space enclosed by the at least two shell elements can be filled with a fluid. The fluid-tight construction of the core element can be achieved in particular by a material bond connection of the shell elements, for example, by gluing. The temporary load carrying capacity which is required particularly at the start of the winding of the at least one roving can be increased in this way. The core element is additionally stabilized in that the hollow space in the core element is temporarily pressurized during winding through an internal pressure by a fluid, a liquid or a gas.

A functional element can preferably be inserted into the core element formed as hollow body before the winding. It is conceivable, for example, to arrange electronics components, for example, a printed circuit board, an energy accumulator, a data storage, a radial module and the like before joining and before subsequent winding around the core element. Functional elements of this type can be used, for example, for a system for damage detection or for detecting load cycles of the multipoint link. The advantage of the multiple-part core element consists in that the functional elements can be installed in a simple manner before assembling the core.

The above-stated object is further met by a method for producing a multipoint link.

According to this, a method for producing a multipoint link for an undercarriage of a vehicle is suggested. The method is characterized by the following method steps: producing at least two shell elements from a foamed material; joining the at least two shell elements to form a hollow core element; and winding around the core element with at least one roving of bundled continuous filaments.

The construction of the core element as a hollow body comprising at least two parts has the advantage of a smaller mass compared to a solid core. The at least two shell elements can be produced more simply and inexpensively than core elements constructed as solid cores or disposable cores with reduced material input. Compared with disposable cores, the core element constructed as a multiple-part hollow body has the additional advantage that loads can be absorbed during the use phase of the multipoint link. In addition, the foamed material can preferably have a higher density than foamed material which may be used to produce solid cores.

BRIEF DESCRIPTION FO THE DRAWINGS

Advantageous embodiment forms of the invention which will be described in the following are shown in the drawings. The drawings show.

DETAILED DESCRIPTION FO THE PRESENTLY PREFERRED EMBODIMENTS

In the following, identical reference numerals are used for identical or functionally similar components.

Figure 1A:
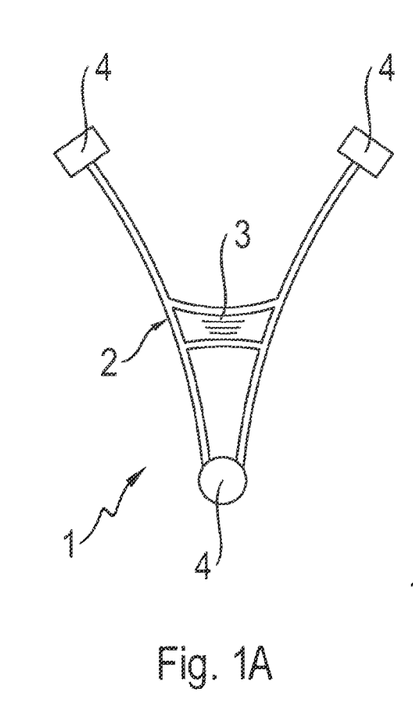
FIGS. 1A to 1C schematic views of multipoint links for an undercarriage of a vehicle.
Figure 1B:
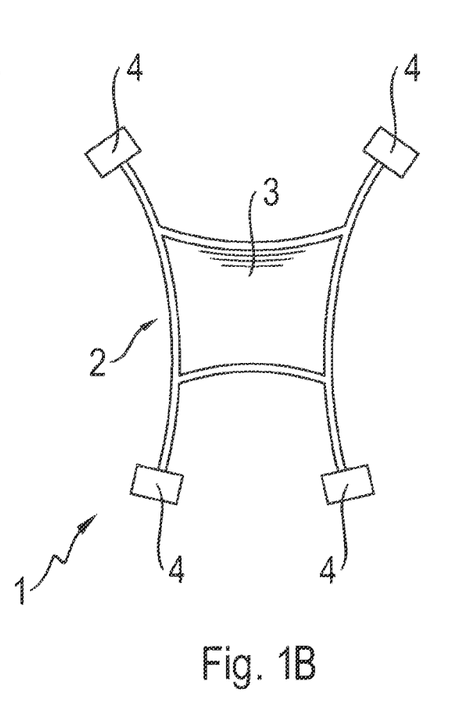
Figure 1C:
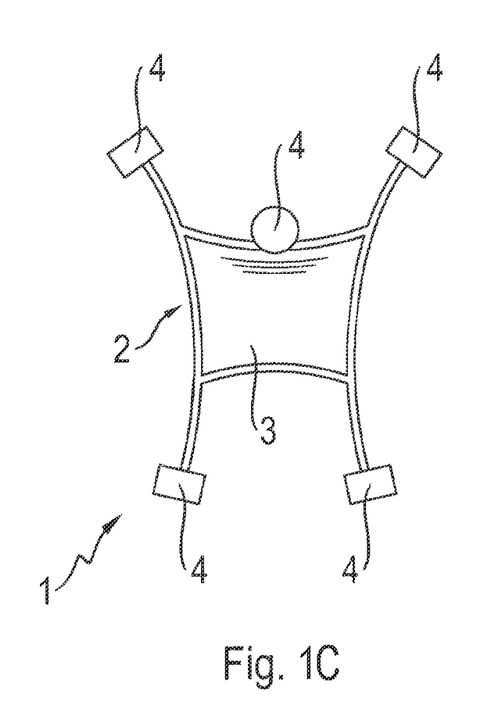

FIGS. 1A to 1C show schematic views of different multipoint links 1 for an undercarriage—not shown—of a vehicle. FIG. 1A shows a multipoint link 1 constructed as a three-point link. The multipoint link 1 comprises a body 2 having a plurality of force introduction areas 4 which are connected to one another by a connection structure 3. The body 2 substantially determines the basic shape of the multipoint link 1. A multipoint link 1 constructed, for example, as a four-point link or as a five-point link is shown in FIGS. 1B and 1C. Multipoint links 1 can connect kinematic points in an undercarriage and/or in a wheel suspension and transmit movements and/or forces. The connection of the multipoint link 1 to further component parts of the undercarriage can be realized by joints which are arranged in the force introduction areas 4.

Figure 2:
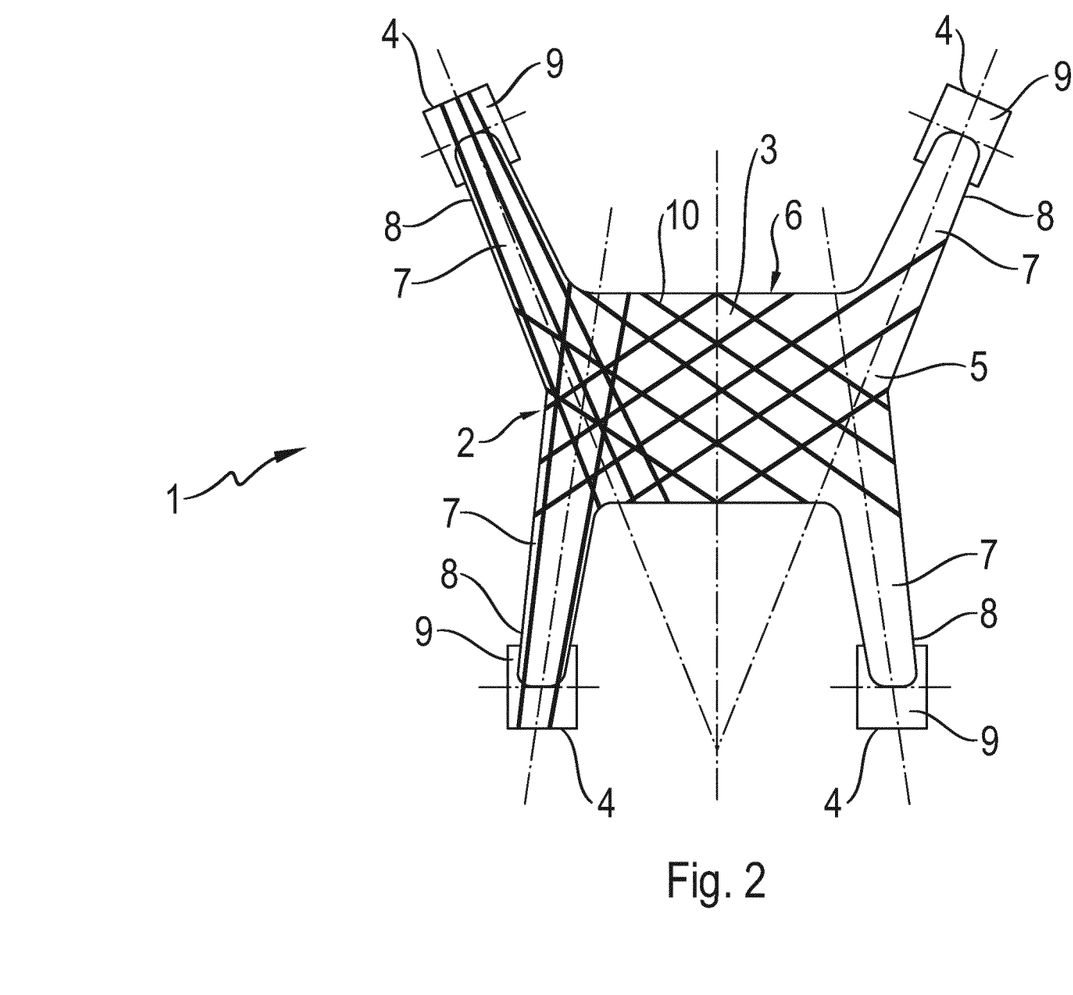
FIG. 2 a schematic top view of a multipoint link constructed as four-point link.

FIG. 2 schematically shows a top view of a multipoint link 1 constructed as four-point link. The multipoint link 1 according to the invention comprises a core element 5 which is formed from a foamed material and at least one roving 10 of bundled continuous filaments wound around the core element 5. The at least one roving 10 wound around the core element 5 in at least one layer forms an outer layer of the multipoint link 1. The core element 5 has a torsion element 6 and four supporting arms 7 which are connected integral with the torsion element 6. Portions 8 for receiving load introduction elements are arranged at the distal ends of the supporting arms 7. To this end, a bushing 9 for receiving a respective load introduction element—not shown—constructed as a ball-and-socket joint or elastomer bearing is arranged at the respective portion 8. The multipoint link 1 constructed as four-point link is used, for example, in a utility vehicle as an undercarriage link and combines the functions of a separate three-point link and a separate roll stabilizer in a single undercarriage component. Accordingly, the multipoint link 1 constructed as four-point link takes on the task of transverse guidance and longitudinal guidance of a rigid axle as well as roll stabilization.

Figure 3:
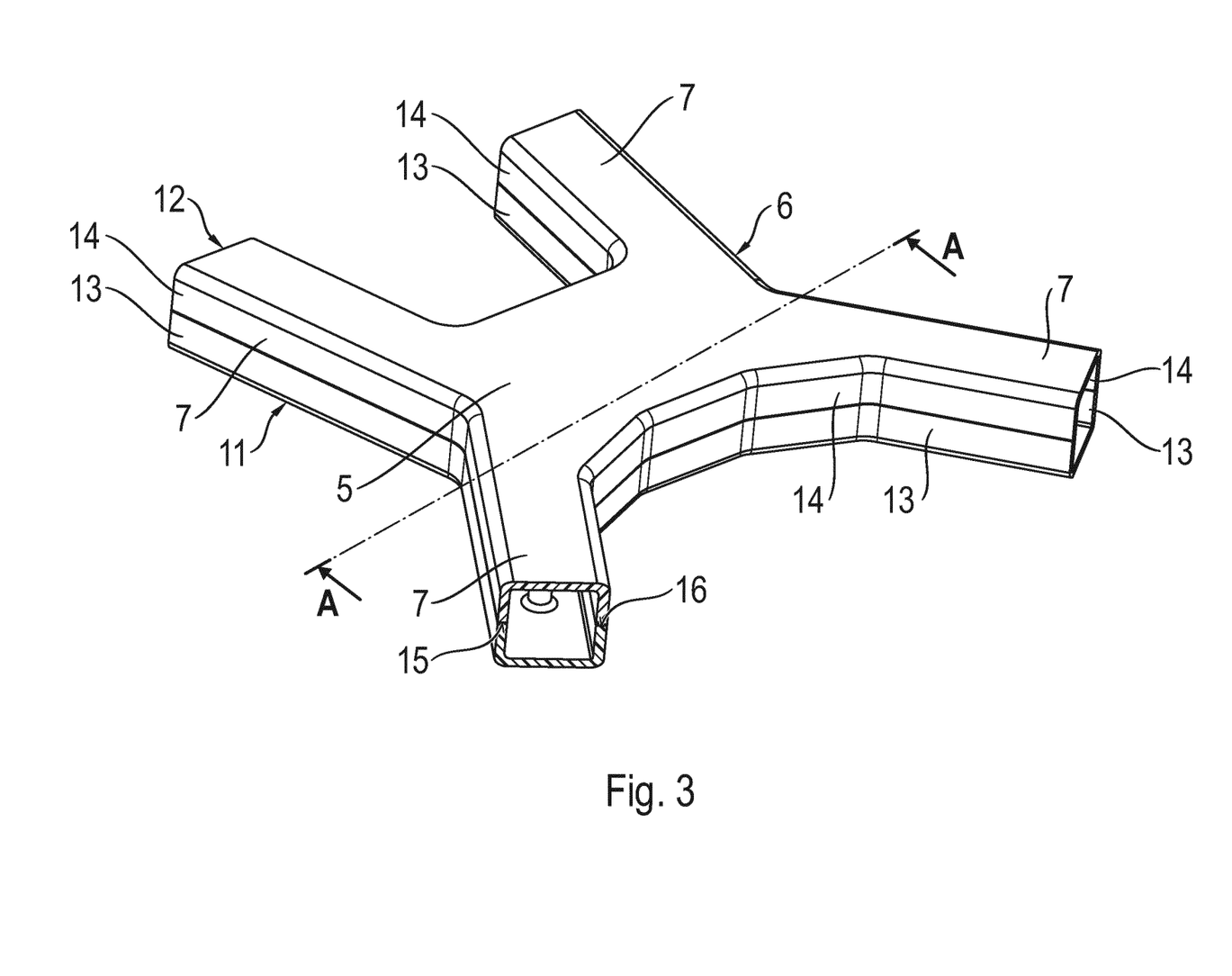
FIG. 3 a schematic perspective partial view of a core element of the multipoint link according to FIG. 2.

FIG. 3 schematically shows a perspective partial view of only the core element 5 according to FIG. 2. According to the invention, the core element 5 is constructed as a hollow body which comprises at least two shell elements 11, 12, which are joined together. In the depicted embodiment example, the lower shell element 11 and the upper shell element 12 are formed as half-shells. The at least two shell elements 11, 12 are preferably symmetrically constructed. The shell elements 11, 12 constructed as half-shells have a substantially U-shaped profile cross section. The shell elements 11, 12 which are joined together to form the core element 5, have walls 13, 14 which are substantially perpendicular to one another. The walls 13, 14 delimit the outer contour of the respective shell elements 11, 12. End faces at the walls 13, 14 form abutment surfaces 15, 16 which extend transverse to walls 13, 14 and on which the shell elements 11, 12 sit one upon the other after being joined. An adhesive can be applied to one or both abutment surfaces 15, 16 prior to joining for a nondetachable connection so that a material bond of the at least two shell elements 11, 12 is achieved. The material bond connection also makes it possible to construct the core element 5 to be fluid-tight.

Figure 4:
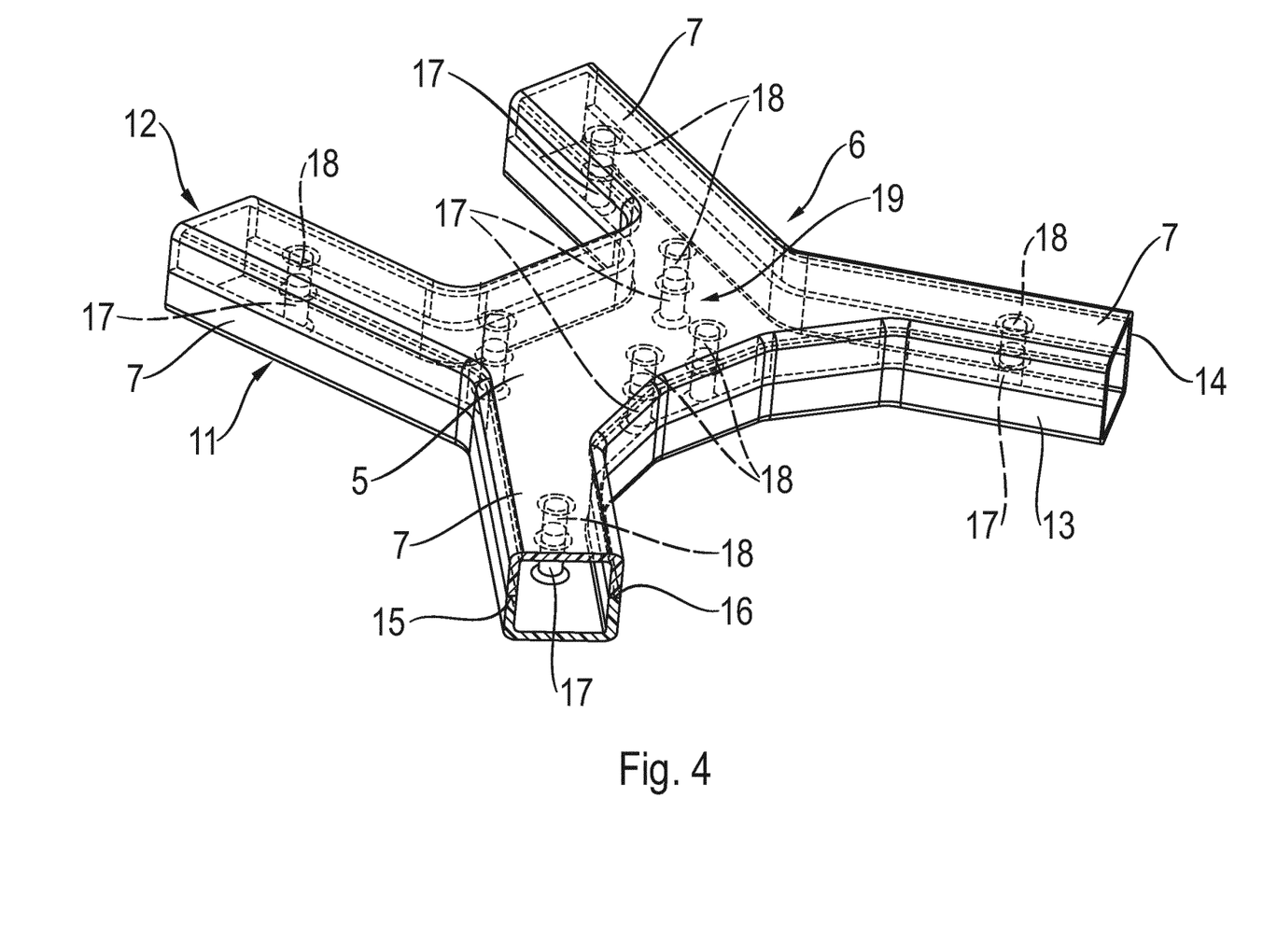
FIG. 4 a schematic view of the core element according to FIG. 3 with a shell element shown transparently.

FIG. 4 schematically shows the core element 5 according to FIG. 3 with an upper shell element 12 shown transparently. Connection elements 17, 18 which are arranged opposite one another in the interior of the two shell elements 11, 12 and are constructed in particular to complement one another are visible through the transparent depiction of the upper shell element 12. The connection elements 17 of the lower shell element 11 can be constructed as cylindrical pins, and the connection elements 18 of the upper shell element 12 can be constructed as hollow-cylindrical portions in which the connection elements 17 constructed as cylindrical pins can be inserted. The at least two shell elements 11, 12 are connected with one another by positive engagement and/or frictional engagement by the complementary connection elements 17, 18. Further, the at least two shell elements 11, 12 can be fixed with respect to their position by the connection elements 17, 18 when joined.

Further, the connection elements 17, 18 function as a supporting structure 19 in the interior of the core element 5. Accordingly, the core element 5 is stiffened, which increases the loadability of the core element 5 particularly at the start of the winding process.

Alternatively, the supporting structure 19 in the interior of the respective shell element 11, 12 can be constructed as ribs or as point-shaped and/or line-shaped spacer elements. In the joined state of the shell elements 11, 12, the ribs or point-shaped and/or line-shaped spacer elements sit one on top of the other so that the compressive forces which are absorbed when the at least one roving 10 is wound around the core element 5 and which result from the filament tension of the roving 10 do not lead to an unwanted deformation of the core element 5.

Figure 5:
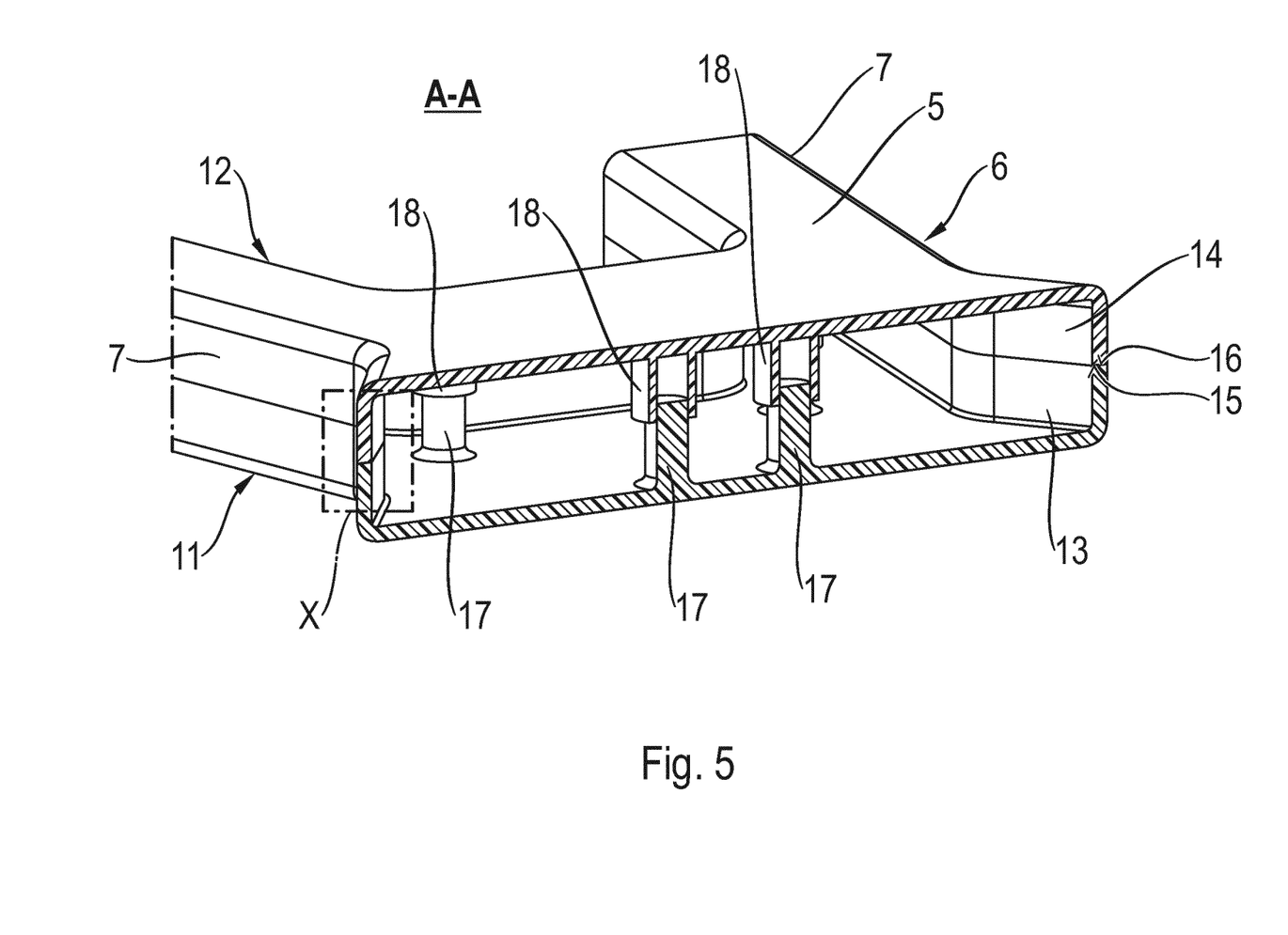
FIG. 5 a schematic sectional view of the core element along line A-A according to FIG. 3.

FIG. 5 schematically shows a sectional view of the core element 5 along line A-A according to FIG. 3. The section through two of the connection elements 17, 18 illustrates the positive engagement connection between the two shell elements 11, 12 by the connection elements 17, 18. In general, two dies are required for producing the at least two shell elements 11, 12 in order to form the shell elements 11, 12 with the complementary connection elements 17, 18. However, it is also possible to use only one die if the core element 5 to be produced has at least two perpendicular symmetry axes and the symmetrical conditions are utilized in a corresponding manner.

Figure 6:
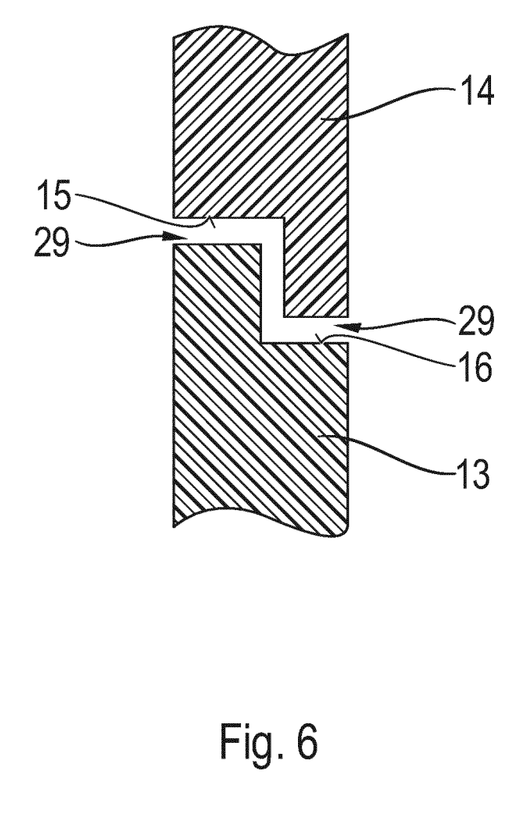
FIG. 6 a detail X according to FIG. 5.

FIG. 6 shows a detail X according to FIG. 5. The walls 13, 14 of the shell elements 11, 12 have undercuts 29, respectively, which engage in one another by positive engagement when the shell elements 11, 12 are joined. In this way, the two shell elements 11, 12 are secured at least against displacement in transverse direction of the core element 5. The undercuts 29 are formed in this instance as projections in the form of steps.

Figure 7:
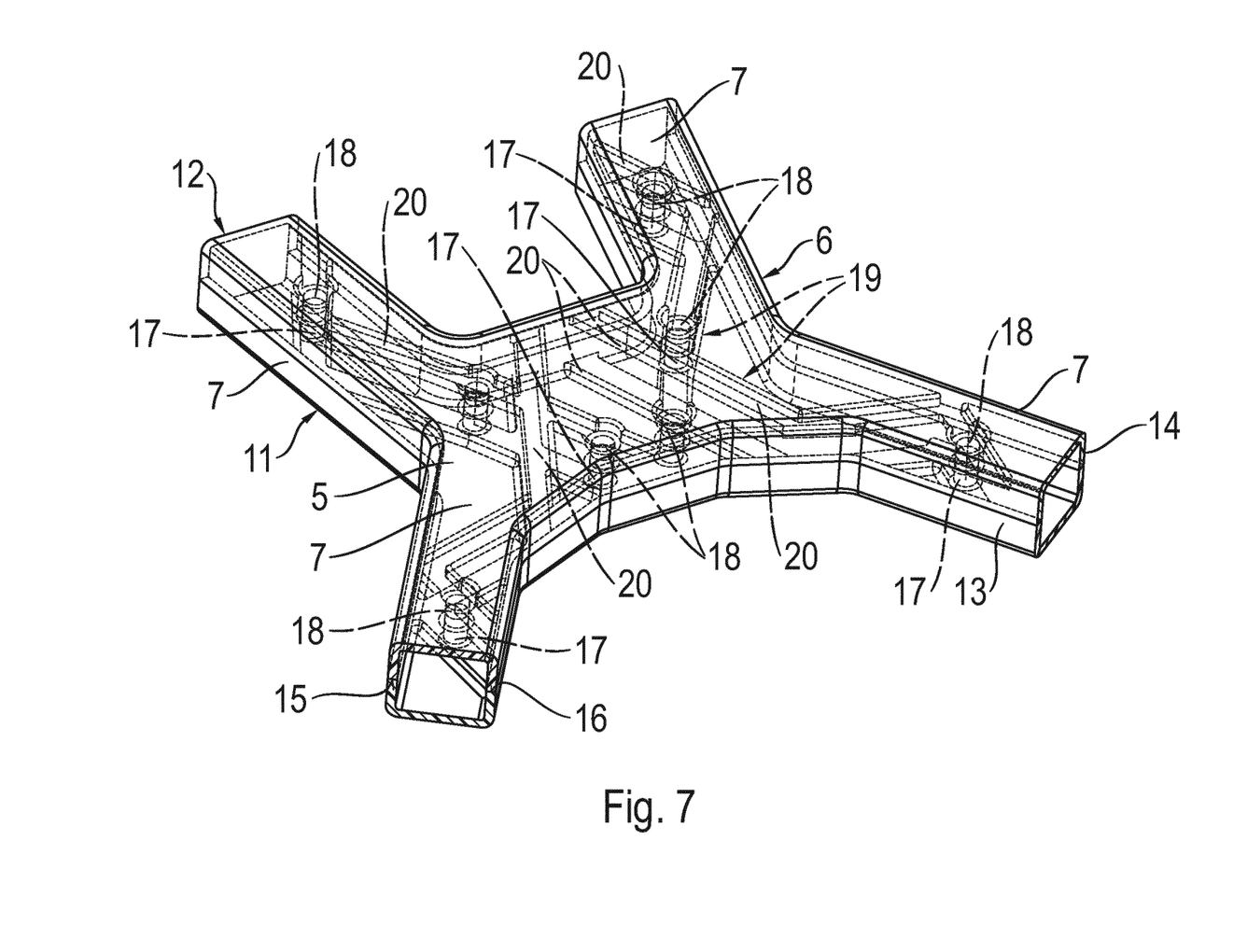
FIG. 7 a schematic view of a further embodiment form of the core element according to FIG. 3 with a shell element shown transparently.

A further embodiment form of the core element 5 according to FIG. 3 is shown schematically in FIG. 7 with an upper shell element 12 shown transparently. This embodiment form has, in addition, a supporting structure 19 which is formed as a material accumulation 20, particularly a structured material accumulation 20, extending in portions over an internal two-dimensional plane of the respective shell element 11, 12. The shape of the material accumulation 20 on the respective inner side of the shell elements 11, 12 can preferably correspond to a framework-like structure.

Figure 8:
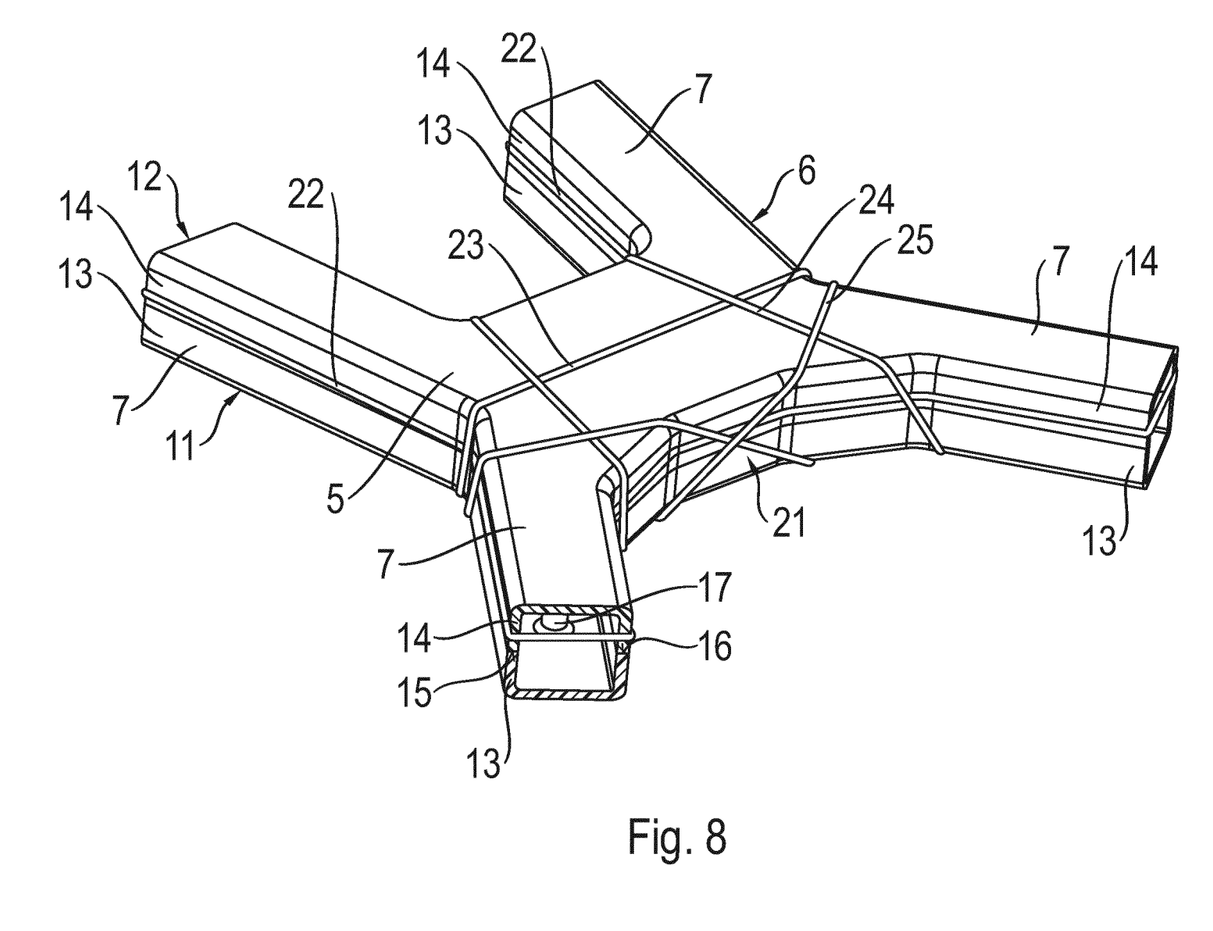
FIG. 8 a schematic perspective partial view of a core element with an external supporting structure.

FIG. 8 schematically shows a perspective partial view of a core element 5 with an external supporting structure 21. The external supporting structure 21 comprises at least one separate roving 22, 23, 24, 25. A plurality of separate rovings 22, 23, 24, 25 are preferably provided in order to join and connect the at least two shell elements 11, 12 to one another to form the core element 5. Therefore, undercuts at the abutment surfaces 15, 16 or gluing the at least two shell elements 11, 12 to one another can be dispensed with. Further, an additional stabilization of the core element 5 is achieved by the separate rovings 22, 23, 24, 25 so that this core element 5 can absorb higher loads during the subsequent winding process.

Figure 9:
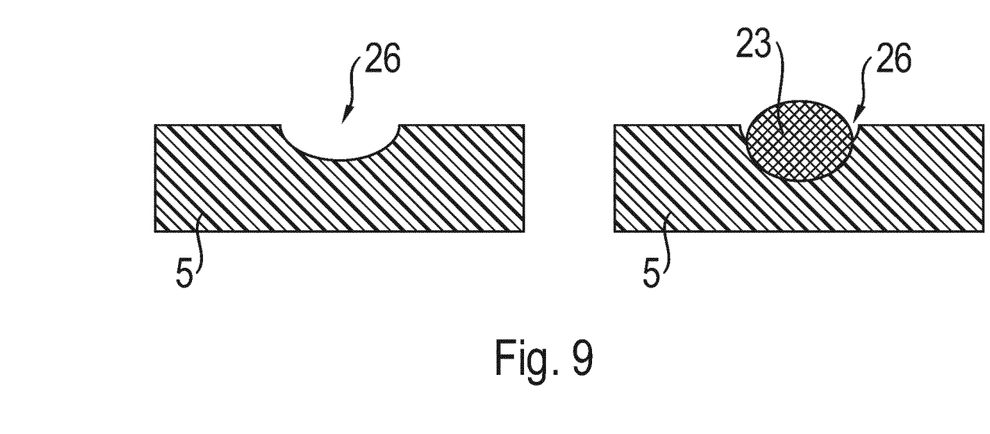
FIG. 9 a schematic view of a guide channel for laying a supporting structure formed as at least one separate roving on the outer side of the core element.

It is provided to arrange guide channels 26 in the surface on the outer side of the at least two shell elements 11, 12 as is shown schematically in FIG. 9. These guide channels 26 can be incorporated in the shell elements 11, 12 already during the production process for the latter. Alternatively, the guide channels 26 can be incorporated by a subsequent machining of the surface of the shell elements 11, 12 or of the core element 5 after it has already been assembled.

The arrangement of the guide channels 26 is preferably carried out independent from geodesic paths. Accordingly, the separate rovings 22, 23, 24, 25 can be freely laid on the surface of the shell elements 11, 12 in order to selectively generate a shape of the supporting structure 21 which at least partially enables a laying of the separate rovings 22, 23, 24, 25 independent from the external shape of the core element 5. In this respect, the shapes of the separate rovings 24 and 25 are referred to by way of example. The laying of the rovings 24 and 25 serves to fix and tighten roving 22 in the guide channel 26 provided therefor, this roving 22 surrounding the core element 5 in circumferential direction along the narrow perpendicularly extending wall 14. The separate rovings 22, 23, 24, 25 can likewise be produced by a robot and preferably form a framework-like structure.

In a further aspect, the separate rovings 22, 23, 24, 25 by which the at least two shell elements 11, 12 are bound and joined are connected to the roving 10 wound around the core element 5 to form an outer layer. Accordingly, a strengthening of the supporting structure of the core element 5 is achieved. In so doing, the separate rovings 22, 23, 24, 25 on the surface of the core element function as framework-like inlay and stiffening of the supporting structure. Since the separate rovings 22, 23, 24, 25 need not be laid on free geodesic paths but rather are located in the guide channels 26, a very free and selective strengthening of the structure is possible, for example, for determined load cases.

Figure 10:
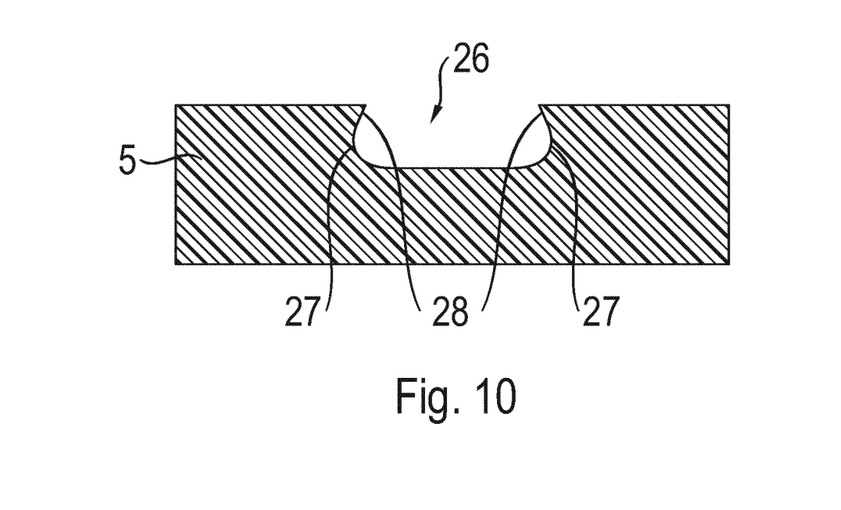
FIG. 10 a schematic view of a guide channel according to a further embodiment form.

FIG. 9 shows a schematic view of a guide channel 26 for laying a supporting structure 21 formed of at least one separate roving 23 on the outer side of the core element 5 and the guide channel 26 with a roving 23 laid therein. The guide channel 26 is constructed as a recess with an arcuate cross section in which the separate roving 23 is laid. According to a further development shown in FIG. 10, the guide channel 26 can have undercuts 28 at the wall portions 27 delimiting the guide channel 26 in order to improve the guiding and holding of the separate rovings 22, 23, 24, 25 in the respective guide channel 26. Accordingly, a better lateral fixing of the separate rovings 22, 23, 24, 25 laid in the guide channels 26 is achieved in particular.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

REFERENCE NUMERALS 1 multipoint link
2 body
3 connection structure
4 force introduction area
5 core element
6 torsion element
7 supporting arm
8 portion
9 bushing 10 roving
11 shell element
12 shell element
13 wall
14 wall
15 abutment surface
16 abutment surface
17 connection element
18 connection element
19 supporting structure
20 material accumulation
21 supporting structure
22 roving
23 roving
24 roving
25 roving
26 guide channel
27 wall portion
28 undercut
29 undercut

The invention claimed is:

1. A multipoint link (1) for an undercarriage of a vehicle, comprising:
   a core element (5) formed from a foamed material and at least one roving (10) of bundled continuous filaments wound around the core element (5),
   wherein the at least one roving (10) winds around the core element (5) in at least one layer and forms an outer layer of the multipoint link (5),
   wherein the core element (5) is constructed as a hollow body that comprises at least two shell elements (11, 12),
   wherein the at least two shell elements (11, 12), which are mated together to form the core element (5), are formed with walls (13, 14) substantially parallel to one another and which delimit an outer contour,
   wherein the walls (13, 14) have complementary undercuts (29) formed as projections in the form of steps at abutment surfaces facing one another such that the at least two shell elements (11, 12) are positively engageable in one another in portions, wherein each projection is substantially parallel to at least one wall,
   wherein each of the walls (13, 14) have an inner side and an outer side that are completely parallel to each other and the undercuts (29) connect the inner side to the outer side, and
   wherein the at least two shell elements (11, 12) are connected to one another by material bonding by gluing the abutment surfaces such that the hollow body forming the core element is constructed fluid-tight.

2. The multipoint link (5) according to claim 1, wherein the at least two shell elements (11, 12) are connected to one another by frictional engagement.

3. The multipoint link (1) according to claim 1, wherein the core element (5) has portions (7) arranged at distal ends thereof for receiving load introduction elements (9).

4. The multipoint link (1) according to claim 1 wherein the at least two shell elements (11, 12) are formed so as to be symmetrical.

5. The multipoint link (1) according to claim 1 wherein the at least two shell elements (11, 12) have an internal supporting structure (19).

6. The multipoint link (1) according to claim 5, wherein the at least two shell elements (11, 12) are connected by positive engagement and/or frictional engagement by the supporting structure (19).

7. The multipoint link (1) according to claim 5, wherein the internal supporting structure (19) is formed as a material accumulation (20) extending in portions over a two-dimensional plane of the respective shell element (11, 12).

8. The multipoint link (1) according to claim 7, wherein the material accumulation (20) forms a framework-like structure.

9. The multipoint link (1) according to claim 1 wherein at least one separate roving (22, 23, 24, 25) is provided to wind in portions around the at least two mated shell elements (11, 12) in order to join the at least two mated shell elements (11, 12) to form the core element (5).

10. The multipoint link (1) according to claim 1 wherein separate rovings (12, 23, 24, 25) are arranged in the interior and/or exterior of the core element (5) in guide channels (26) for strengthening the core element (5).

11. The multipoint link (1) according to claim 1 wherein the at least two shell elements (11, 12) are constructed fluid-tight in a joined position so that a hollow space enclosed by the at least two shell elements (11, 12) is fillable with a fluid.

12. The multipoint link (1) according to claim 1 wherein a functional element is insertable into the core element (5) formed as hollow body prior to winding.

13. A method for producing a multipoint link (1) for an undercarriage of a vehicle according to claim 1, the method comprising:
   producing the at least two shell elements (11, 12) from a foamed material;
   joining the at least two shell elements (11, 12) to form the hollow core element (5); and
   winding around the core element (5) with at least one roving (10) of bundled continuous filaments.

14. The method according to claim 13, further comprising temporarily pressurizing the hollow space in the core element during winding through an internal pressure by a fluid, a liquid or a gas.

15. The multipoint link (5) according to claim 1, wherein the at least two shell elements (11, 12) are connected to one another by complementary connection elements arranged in a hollow space enclosed by the at least two shell elements.

16. The multipoint link (5) according to claim 15, wherein the complementary connection elements are hollow-cylindrical portions and cylindrical pins.

17. The multipoint link (5) according to claim 1, wherein an adhesive for the gluing is applied to both abutment surfaces.

* * * * *